(No Model.) 2 Sheets—Sheet 1.

E. A. PORTER.
CORN HUSKING AND CRUSHING MACHINE.

No. 391,646. Patented Oct. 23, 1888.

WITNESSES.
T. Walter Fowler.
W. H. Patterson.

INVENTOR.
Eugene A. Porter.
per A. H. Evans & Co.
Attorneys.

N. PETERS. Photo-Lithographer, Washington, D. C.

(No Model.) 2 Sheets—Sheet 2.
E. A. PORTER.
CORN HUSKING AND CRUSHING MACHINE.

No. 391,646. Patented Oct. 23, 1888.

WITNESSES,
T. Walter Fowler
W. H. Patterson.

INVENTOR.
Eugene A. Porter,
per A. H. Evans & Co.
Attorneys.

UNITED STATES PATENT OFFICE.

EUGENE A. PORTER, OF BOWLING GREEN, KENTUCKY.

CORN HUSKING AND CRUSHING MACHINE.

SPECIFICATION forming part of Letters Patent No. 391,646, dated October 23, 1888.

Application filed December 16, 1887. Serial No. 258,079. (No model.)

*To all whom it may concern:*

Be it known that I, EUGENE A. PORTER, a citizen of the United States, residing at Bowling Green, in the county of Warren and State of Kentucky, have invented certain new and useful Improvements in Corn Husking and Crushing Machines; and I do hereby declare the following to be a full, clear, and exact description of the said invention, reference being had to the accompanying drawings, forming a part of this specification, in which—

Figure 1:
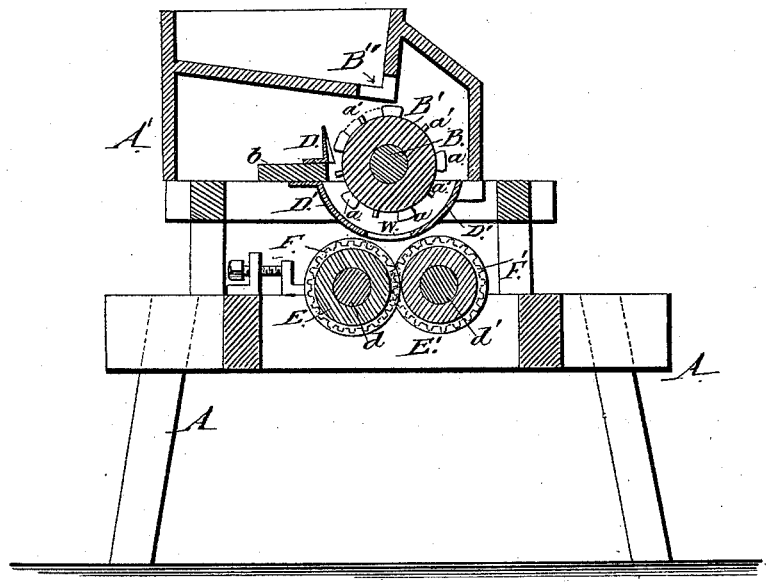
Figure 2:
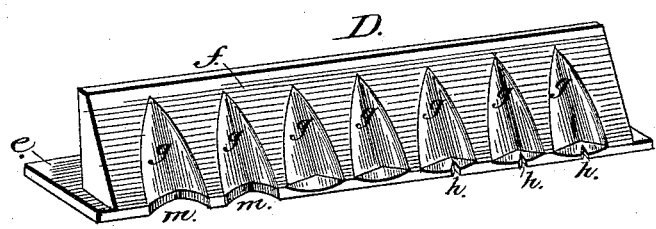
Figure 3:
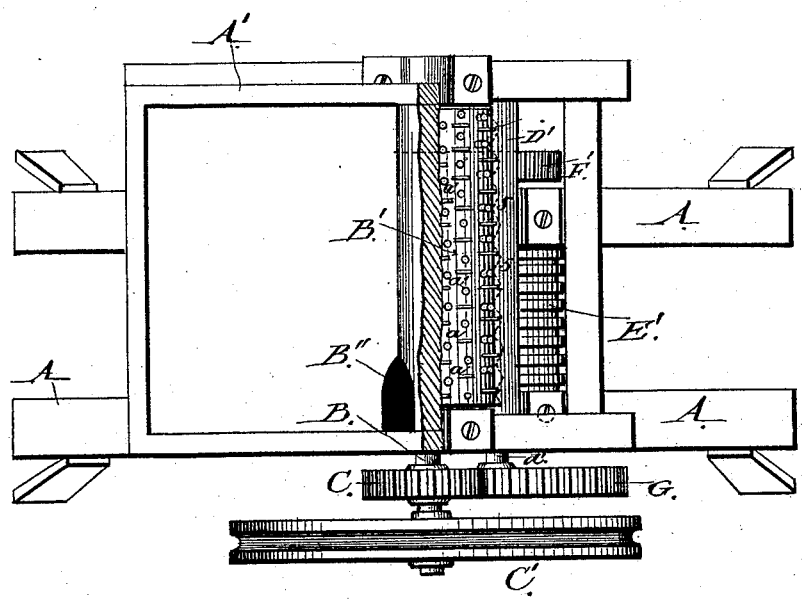
Figure 4:
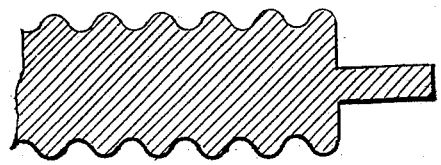

Figure 1 represents a sectional view of a corn husking and crushing machine embodying my improvements. Fig. 2 is a detail of the shoe or bar against which the cobs are broken. Fig. 3 is an enlarged plan view showing the gears, &c. Fig. 4 is a modification, to be referred to.

My invention relates to machines for crushing corn for stock purposes. It is an improvement on a former patent, No. 360,044, granted to me March 29, 1887, for a similar machine; and it consists in the improved constructions and combinations of devices, which I shall hereinafter fully describe and claim.

To enable others skilled in the art to make and use my invention, I will proceed to describe the exact manner in which I have carried it out.

In the said drawings, A represents a suitable frame-work for supporting the operating parts of the machine, and also for supporting a supplementary frame, A', on which is journaled the shaft B, having suitable bearings and carrying the drum B', the pinion C, and band-wheel C'. On the periphery of the drum B' and throughout its length I secure short sharp cutting-blades a, arranged in quincunx order, to split the shucks and break the cobs as the ears of corn pass from the hopper onto the drum through the opening B''.

In addition to the cutting-blades I secure upon the entire outer surface of the drum a number of projections or teeth, a', arranged in quincunx order for stripping the grains of corn from the cob, as shown and described in my said former patent. As the cobs pass through the opening, they fall upon the drum and are carried by the latter against a shoe or bar, D, secured to a cross-bar, b, close to the drum, and are held against said shoe until broken in desired lengths or pieces. This bar D, which is represented in detail in Fig. 2, consists of the plates e and f, the latter being set at an incline, so that the lower edge of its face is adjacent to the periphery of the drum or the edges of the cutter-blades thereon. The inclined plate f is grooved at g to receive and hold the ears of corn while being acted on by the cutters, and the lower edge of said plate, at the base of the groove, is preferably notched at h in the path of the cutter-blades to permit the passage of the latter after they have cut through the cob. The drum is preferably provided with cutter-blades longer than the stripping-teeth, in order that the cobs may be broken across the grooves in the face of the bar D. Therefore, it is advisable that the base of the inclined plate should be notched, as described. These notches, while greatly desirable, are not absolutely needed, as the bar D is set close enough to the periphery of the drum to resist the passage of pieces of cobs larger than what will readily pass between the underlying crushing-rolls.

I may, if desirable, provide the drum with continuous cutters or disks, or flute its surface, as shown in Fig. 4, in which case the grooves g in the plate f are continued downward through the plate e, as shown at m in Fig. 2; but, as before stated, I have been able to obtain the best results from the use of the cutter-blades and the plate with the notched base. As the cobs, grain, and husks pass from the drum, they fall into a second hopper, D', situated immediately beneath the drum B', and from this hopper they pass through an opening, W, to the crushing-rolls E E', carried on the shafts d d', and having suitable bearings in the frame A. On these shafts are also the intermeshing spur-wheels F F', and on the opposite end of the shaft d is secured the large cog-wheel G, intermeshing with and driven by the pinion C on the shaft B. The spur-wheel F on the shaft d drives the shaft d' through the other spur-wheel F'.

Having thus described my invention, what I claim as new, and desire to secure by Letters Patent, is—

The main and supplemental frames, the rotating drum, with its cutter-blades and teeth, crushing-rolls beneath said drum, and means for rotating said rolls and drum, in combination with a crushing shoe or bar adjacent to the drum, having its face inclined and grooved to receive and hold the ear-corn while being broken, and having notches in its base to permit the passage of the cutter-blades, substantially as described.

EUGENE A. PORTER.

Witnesses:
 THOS. POLLARD,
 KEITH PILLSBURY.